United States Patent
Pilz et al.

(10) Patent No.: US 11,055,245 B2
(45) Date of Patent: Jul. 6, 2021

(54) METHOD FOR COMMUNICATION BETWEEN A SENSOR AND A CONNECTING ELEMENT

(71) Applicant: Endress+Hauser Conducta GmbH+Co. KG, Gerlingen (DE)

(72) Inventors: Stefan Pilz, Geithain (DE); Sven-Matthias Scheibe, Dresden (DE); Tobias Mieth, Dresden (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 93 days.

(21) Appl. No.: 15/210,951

(22) Filed: Jul. 15, 2016

(65) Prior Publication Data
US 2017/0017599 A1 Jan. 19, 2017

(30) Foreign Application Priority Data
Jul. 16, 2015 (DE) ...................... 10 2015 111 594.8

(51) Int. Cl.
 *G06F 13/00* (2006.01)
 *G06F 13/40* (2006.01)
 *G06F 13/42* (2006.01)
 *H04L 29/08* (2006.01)

(52) U.S. Cl.
CPC ...... *G06F 13/4022* (2013.01); *G06F 13/4282* (2013.01); *H04L 67/12* (2013.01)

(58) Field of Classification Search
CPC .......................... G06F 13/4022; G06F 13/4282
USPC ...................................................... 710/316
See application file for complete search history.

(56) References Cited

U.S. PATENT DOCUMENTS

| | | | | |
|---|---|---|---|---|
| 6,131,125 A * | 10/2000 | Rostoker | .............. | G06F 9/4411 709/227 |
| 8,208,635 B2 * | 6/2012 | Karschnia | ............. | H04W 12/04 380/270 |
| 2006/0254911 A1 * | 11/2006 | Lindmueller | ........... | H01F 38/14 204/424 |

(Continued)

FOREIGN PATENT DOCUMENTS

| CN | 102461325 A | 5/2012 |
|---|---|---|
| CN | 202617082 U | 12/2012 |

(Continued)

OTHER PUBLICATIONS

Search Report for German Patent Application No. 10 2015 111 594.8, German Patent Office, dated Mar. 1, 2016, 8 pp.

*Primary Examiner* — Chun Kuan Lee
(74) *Attorney, Agent, or Firm* — Christopher R. Powers; Endress+Hauser (USA) Holding Inc.

(57) ABSTRACT

The disclosure relates to a method for communication in process automation between a sensor and a connecting element connectable to the sensor, wherein the sensor is configured for acquisition of a measured variable of the process automation and for transmission of a value that is dependent upon the measured variable value to the connecting element, wherein the connecting element for transmission of the value dependent upon the measured variable to a parent unit is configured via a first protocol. The method is characterized in that communication between the sensor and the connecting element takes place without the knowledge of the parent unit using a second protocol, the second protocol being independent of the first protocol.

16 Claims, 5 Drawing Sheets

(56) References Cited

U.S. PATENT DOCUMENTS

| | | | | |
|---|---|---|---|---|
| 2009/0010233 A1* | 1/2009 | Pratt, Jr. | ................ | G01D 21/00 |
| | | | | 370/338 |
| 2009/0216511 A1* | 8/2009 | Babel | ................. | G05B 23/0256 |
| | | | | 703/13 |
| 2011/0238190 A1* | 9/2011 | Okamoto | ........... | G05B 19/0426 |
| | | | | 700/86 |
| 2014/0121789 A1* | 5/2014 | Brandes | ............... | G05B 23/027 |
| | | | | 700/80 |

FOREIGN PATENT DOCUMENTS

| | | | |
|---|---|---|---|
| CN | 103518353 | A | 1/2014 |
| CN | 104567982 | A | 4/2015 |
| CN | 104735126 | A | 6/2015 |
| DE | 19730158 | A1 | 2/1999 |
| DE | 69508424 | T2 | 9/1999 |
| DE | 10354659 | A1 | 6/2005 |
| WO | 2015081316 | A1 | 6/2015 |

* cited by examiner

METHOD FOR COMMUNICATION BETWEEN A SENSOR AND A CONNECTING ELEMENT

CROSS-REFERENCE TO RELATED APPLICATIONS

The present application is related to and claims the priority benefit of German Patent Application No. 10 2015 111 594.8, filed on Jul. 16, 2015, the entire contents of which are incorporated herein by reference.

TECHNICAL FIELD

The present disclosure relates to a method for communication in process automation between a sensor and a connecting element connectable to the sensor.

BACKGROUND

Conventional sensors of process automation technology are connected by means of a cable to a parent unit—often to a control system or a transmitter. A distinction is often made between fixed cable sensors and attachable sensors. For fixed cable sensors, the sensor and the associated connecting cables are non-detachably connected. For attachable sensors, the connection between the sensor and the associated cable is accomplished by a special connector, such as a bayonet connector. The applicant, for example, markets such attachable sensors under the name "Memosens."

For attachable sensors, the connecting element in the context of this disclosure comprises the cable, the connector (for example, in the form of a bayonet connector), and an intelligent unit (for example, in the form of a microcontroller). The intelligent unit is optionally enclosed in a housing on the cable or connector. For fixed cable sensors, the connecting element comprises an intelligent unit (for example, in the form of a microcontroller) and terminals as part of the parent unit, such as an output-side area of the parent unit. This intelligent unit can be separate or be part of another intelligent unit—commonly, a microcontroller as well. In both cases—for the fixed cable sensor and attachable sensor—the connecting element is thus to be regarded as separate from the sensor.

Bi-directional communication between the sensor and the parent unit is accomplished via the cable or connecting cable. In addition, the sensor is supplied with power by the parent unit via the cable or connecting cable. The cable or connecting cable is a repeater in the transmission channel from the parent unit to the sensor. For this purpose, the cable or connecting cable comprises an electronic unit with a circuit—for example, as mentioned, with a microcontroller—and an amplifier.

Conventionally, the connecting element and the sensor cannot exchange data with one another. As mentioned, the cable with the intelligent unit (for attachable sensors) or an output-side area of the parent unit with an intelligent unit (for fixed cable sensors) is to act as a connecting element for the purposes of this disclosure. The sensor, therefore, cannot communicate with the cable (attachable sensor) or the output-side area of the parent unit (fixed cable sensor), or with the respective intelligent units. There is a class of circuits of the cable with certain characteristics and a class of sensors with certain characteristics. The cable class and sensor class are compatible with one another.

DE 10 2007 048 812 describes a method as to how a cable can exchange information with a sensor. Unused bits in the transmitted communication protocol are used for this purpose. A new cable class with improved characteristics—for example, to be able to provide a new sensor class with more power—is incompatible with older classes. In addition, for existing measuring points, the information on the sensor class cannot reach the cable circuit through the parent unit, because such a function is not implemented in existing parent units or cables. Furthermore, the following disadvantages are known from DE 10 2007 048 812: Cable and sensor must have information about unused bits in the supported protocol in order to be able to communicate via those bits. It follows that these bits are then not unused after all, because they are used for the cable-sensor communication. If these bits are nevertheless used at a later time, this will interfere with the communication between the cable and the sensor. Furthermore, the transmission between the cable and sensor works only with this known communication protocol. With other communication protocols, this technique fails, or the bits will be misinterpreted. Finally, the cable and sensor can only communicate with one another if the parent unit queries the sensor. Accordingly, there remains a need for further contributions in this area of technology.

BRIEF SUMMARY

The present disclosure includes a method for communication in process automation between a sensor and a connecting element connectable to the sensor, wherein the sensor is configured for acquisition of a measured variable of the process automation and for transmission of a value that is dependent upon the measured variable value to the connecting element, wherein the connecting element for transmission of the value dependent upon the measured variable to a parent unit is configured via a first protocol. Communication between sensor and connecting element or between sensor and parent unit in the context of this disclosure is to be understood such that sensor as well as connecting element and parent unit each comprise at least one intelligent unit, for example, in the form of a microcontroller, and the communication takes place between these elements.

The object of this disclosure is to provide a method that allows different cable classes and sensor classes to be interconnected. The object is achieved by a method characterized in that communication between the sensor and the connecting element takes place without the knowledge of the parent unit, using a second protocol, wherein the second protocol is independent of the first protocol. It is now possible to operate different classes on one and the same interface.

According to at least one embodiment of the present disclosure, the connecting element thus comprises a logical unit that performs at least the characterizing part of the method. This logical unit may be part of the intelligent unit—for example, in the form of a microcontroller—of the cable (for attachable sensors), or part of an output-side area of the parent unit (for fixed cable sensors).

In certain embodiments, communication takes place from the sensor to the connecting element. Advantageously, communication further takes place from the connecting element to the sensor. The communication can be initiated by either the connecting element or the sensor, which allows for information to be transmitted faster.

In at least one embodiment, the second protocol comprises at least parameters, commands, status and setting values—in particular, an item of information on performance class, consumer class, modulation degree, modulation type, electronic temperature, error rate of the communication, data encoding, data rate, protocol type, or protocol version. In a further embodiment, the second protocol comprises the history of the connecting element and the operating location or locations of the connecting element.

In a further embodiment, the sensor and the connecting element are in a basic operating mode with basic functionality before being connected to one another, and, after the communication by means of the second protocol, the sensor and connecting element each switch to a state of higher order with extended functionality, if the sensor and connecting element each support this state, but remain in the basic operating mode if only one of the two supports this state. The sensor and the connecting element thus switch to the best possible state to achieve optimal communication between one another.

In at least one embodiment, the sensor and the connecting element switch to the basic operating mode in the event of a fault. In this manner, it can be ensured that communication can always take place. A fault may also be defined if, for example, the connecting element is unplugged from the sensor. After all, it is not immediately obvious after reconnection whether or not the same sensor, or another one, is connected. To ensure optimal compatibility, the sensor and connecting element may then each switch back to the basic operating mode.

In a further embodiment, the second protocol is synchronized with the first protocol. The second protocol thus uses a time slot in the first protocol and optimally takes advantage of the unused time in the first protocol. The second protocol thus shares the transmission channel with the first protocol via time division multiplexing. The second protocol must listen in, in order not to cause a collision with the first protocol.

In at least one embodiment, communication from the sensor to the parent unit takes place only after an initialization phase, also called a boot phase, between the sensor and connecting element. In particular, the sensor responds to a query from the parent unit only after the initialization phase. In other words, communication between the parent unit and the sensor takes place only after the communication between the sensor and the connecting element is completed and established.

In certain embodiments, further communication between the sensor and the connecting element, after the communication between the sensor and the parent unit, is on-demand, cyclical, or event-driven. This means that the communication between the sensor and the connecting element does not take place only once during initialization, but can also take place at a later time.

The sensor and the connecting element communicate via a first and second interface, wherein the interfaces are configured as inductive interfaces, and the sensor is supplied with power via the interfaces. The connecting element is thus part of a cable. The cable connects the sensor to the parent unit.

In at least one embodiment, the sensor is configured as a fixed cable sensor. The connecting element is part of the parent unit or an output-side area of the parent unit. The connecting element comprises an intelligent unit, for example, in the form of a microcontroller. In an embodiment, this microcontroller of the connecting element is implemented as a separate unit. In an alternative embodiment, the microcontroller of the connecting element or its functionality is implemented as part of the parent unit.

In at least one embodiment, the first protocol is configured as an EIA-485-compliant, Modbus, PROFIBUS, Fieldbus, 4-20 mA, HART, WirelessHART, or proprietary protocol.

BRIEF DESCRIPTION OF THE DRAWINGS

The disclosure is explained in more detail with reference to the following figures, in which.

In the figures, the same features are marked with the same reference symbols.

DETAILED DESCRIPTION

Figure 1A:
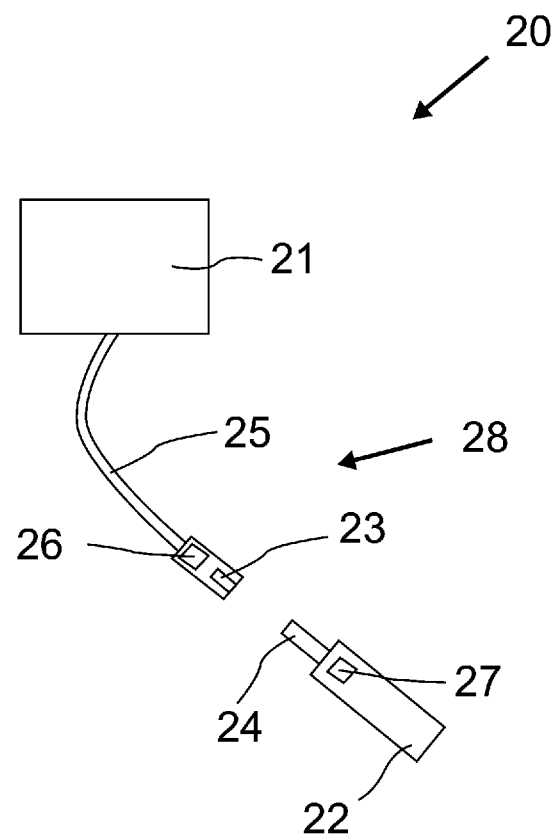
FIG. 1a shows an attachable sensor according to an embodiment of the present disclosure.
Figure 1B:
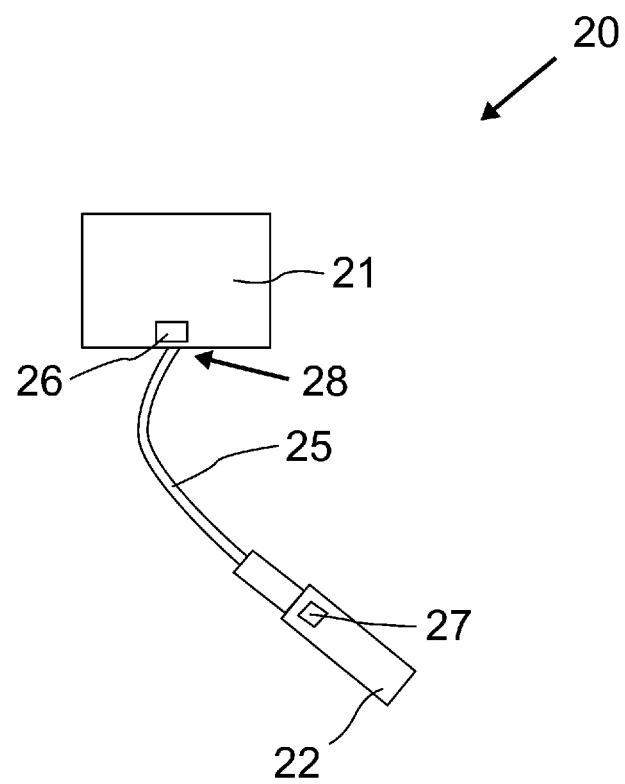
FIG. 1b shows a fixed cable sensor according to an embodiment of the present disclosure.

FIGS. 1a and 1b show embodiments of a measuring point 20 in which the disclosed method may be used according to the present disclosure. FIG. 1a shows an attachable sensor 22. The sensor 22 communicates with a parent unit via a first interface 24. In the example, a transmitter 21 is connected. The transmitter 21 may also be referred to as a measuring transducer 21 herein (commonly abbreviated MT). In the communication between measuring transducer 21 and sensor 22, the measuring transducer 21 serves as the master. In a further embodiment, the sensor 22 communicates with a control system (not shown). Without limiting the scope of the disclosure, the communication will be illustrated in the following with a measuring transducer. A cable 25 is connected to the transmitter 21; at the other end of the cable, an interface 23 is provided that is complementary to the first interface 24. The interfaces 23, 24 in such an embodiment are configured as galvanically isolated—in particular, as inductive—interfaces, that are coupled to one another by means of a mechanical plug connection. The mechanical plug connection is hermetically sealed so that no liquid, such as the medium to be measured, air, or dust, can penetrate from the outside.

The interfaces 23, 24 are used for transmitting data (bi-directionally) and power (uni-directionally, i.e., from transmitter 21 to sensor 22). The measuring point 20 is used predominantly in process automation. The sensor 22 could therefore be, for example, a pH, redox potential, or an ISFET, temperature, conductivity, pressure, oxygen—particularly, dissolved oxygen—or carbon dioxide sensor; an ion-selective sensor; an optical sensor—in particular, a turbidity sensor, a sensor for optical determination of oxygen concentration, or a sensor for determining the number of cells and cell structures; a sensor for monitoring certain organic or metallic compounds; a sensor for determining a concentration of a chemical substance—for example, of a particular element or a particular compound; or a biosensor—for example, a glucose sensor.

Both sensor 22 and cable 25 may comprise microcontrollers 26 or 27.

For attachable sensors, a connecting element 28 according to the disclosure comprises the cable 25, the interface 23, and the microcontroller 26. The microcontroller 26 is housed in a housing on the interface 23.

FIG. 1b shows a fixed cable sensor 22. For fixed cable sensors, as shown in FIG. 1b, the connecting element 28 comprises the microcontroller 26 and terminals (not shown) as part of the parent unit 21. The microcontroller 26 may be implemented separately (as shown) or as part of another intelligent unit (not shown). For fixed cable sensors, the sensor 22 and the associated connecting cables 25 are non-detachably connected. The connection cable 25 is connected with the parent unit 21—for example, by means of terminals.

In both instances—fixed cable sensor and attachable sensor—the connecting element 28 is thus to be regarded as separate from the sensor 22.

The concept of the disclosure avoids the disadvantages of the prior art by providing a separate customized communication protocol between the connecting element 28 and the sensor 22, which establishes a separate communications channel between the connecting element 28 and the sensor 22 independently from the master-sensor communication (i.e., between parent unit 21 and the sensor 22).

Figure 2:
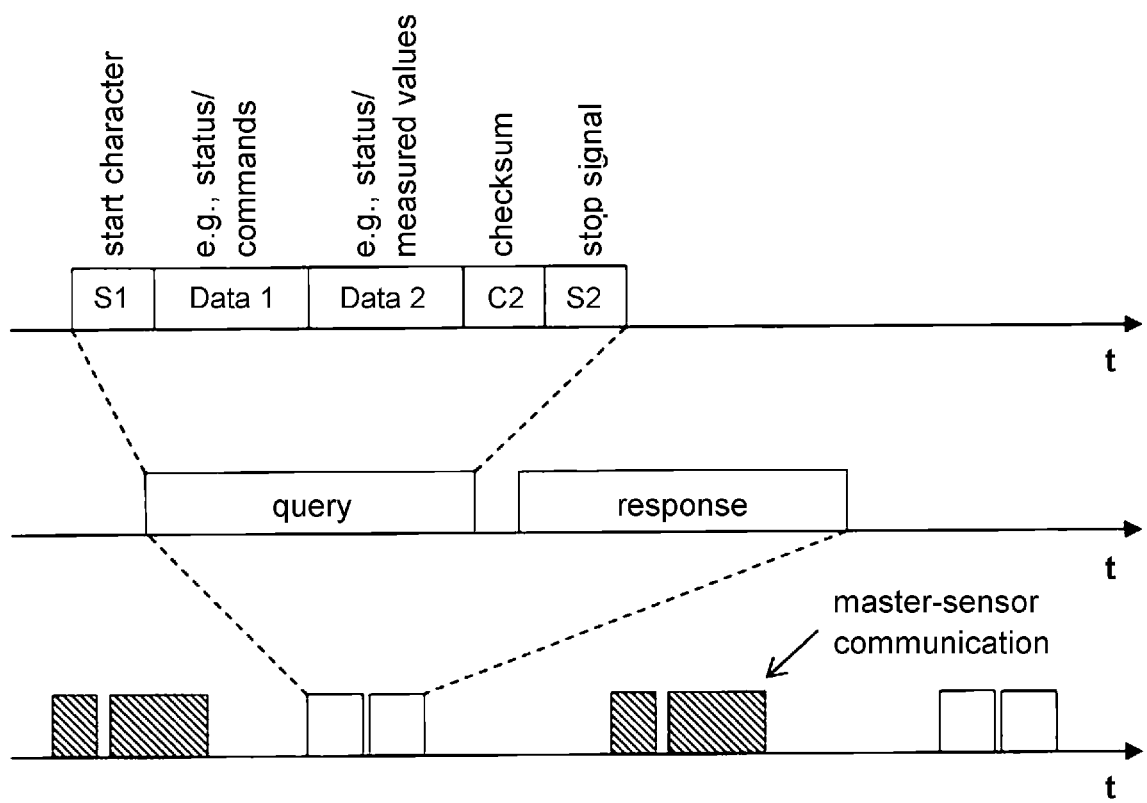
FIG. 2 illustrates a method of communication according to the invention in an overview.

An exemplary illustration of such communication including a communication message is shown in FIG. 2. The message is exemplary and can of course also comprise a different structure, and thereby more fields, than those illustrated. The message includes, for example, the field's message length (constant or defined length, in which case the stop signal can be omitted, or variable length with stop signal or field with current length specification), message type and message version, data, checksum, or others. Depending upon the length of the entire message, a correspondingly suitable checksum can also be used—for example, BCC, CRC, etc. Alternative to calculating a checksum, the message can also be sent multiple times—for example, twice—and the respective transmissions can be compared with one another. This alternative might be easier, because this comparison requires low computing power.

Figure 3:
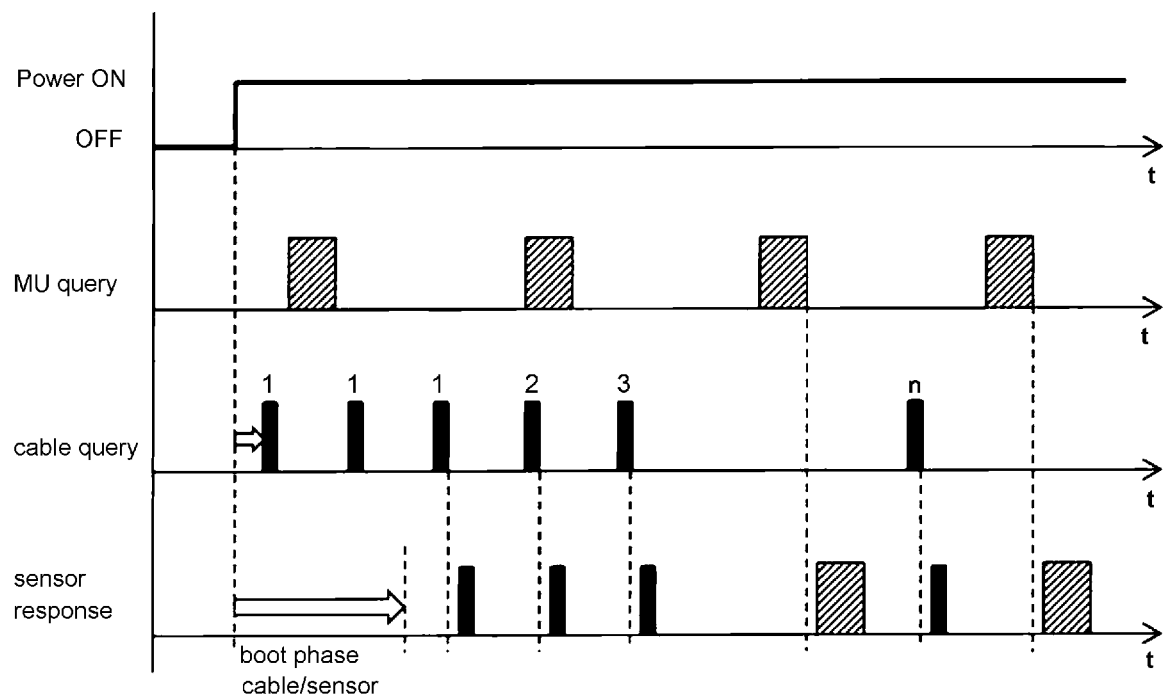
FIG. 3 depicts the starting behavior of the sensor, cable, and measuring transducer combination for attachable sensors according to the invention in an overview.

The basic sequence for communication independent of the protocol of the measuring transducer 21 to the sensor with the exchange of operating parameters may look as shown in FIG. 3.

At the beginning, the measuring transducer 21 switches on the power of the connecting element 28, and, thereby, sensor 22 (i.e., power ON). After a boot phase, the connecting element 28 initiates the corresponding communication to the sensor 22 (e.g., messages 1, 2, 3). The sensor 22 responds to the query accordingly. Only after all the parameters have been exchanged is the communication between the measuring transducer 21 and the sensor 22 activated. Occasionally or cyclically, communication can then take place between the connecting element 28 and the sensor 22 (e.g., message n).

As apparent from FIG. 3, communication from the sensor 22 to the parent unit 21 takes place only after an initialization phase—also called a boot phase—between the sensor 22 and connecting element 28. In particular, the sensor 22 responds to a query from the parent unit 21 only after the initialization phase.

With the method according to the present disclosure, different cable classes and sensor classes can be used that are compatible with one another. This is because a new cable class, by default, has the characteristics of the old cable class (i.e., no separate communication to the sensor). Before plugging the sensor 22 and the connecting member 28 together, they are in a basic operating mode with basic functionality. This permits sensors 22 of the old sensor class to also be operated with the new cable class. After start-up, sensors 22 of the new sensor class are initially operable as sensors of the old class. During this phase, they can communicate with the cable circuit, because it is also set to the old sensor class. Now, the sensor can the communicate to the cable that it is part of the new sensor class. In response, the cable then sets the new characteristics. The sensor 22 also switches to the new characteristics. After the communication, the sensor 22 and the connecting member 28 are each in a higher-order state with extended functionality, if the sensor 22 and the connecting element 28 each support this state. If only one of the two supports this state, they remain in the basic operating mode. It is also conceivable that several classes are present. The sensor 22 then communicates with the connecting element 28 by means of the communication protocol which the two have in common. In case of a fault, the connecting element 28 and the sensor 22 switch back to the basic operating mode. A fault may include, for example, faulty communication, measured values outside an allowable range, or simply removal of the sensor 22 from the connecting element 28.

The protocol between the sensor 22 and the connecting element 28 is synchronized with the protocol between the sensor 22 and the transmitter 21. The sensor-connecting element protocol shares the transmission channel with the sensor-transmitter protocol by time division multiplexing. Synchronization means that the sensor-connecting element protocol must listen in, in order not to cause collisions with the sensor-transmitter protocol.

It is also possible that both protocols communicate simultaneously, but on different transmission channels. In one embodiment, the sensor-transmitter protocol transmits data using amplitude shift keying. The sensor-connecting element protocol transmits data using another type of amplitude shift keying, frequency shift keying, or other modulation methods.

Figure 4:
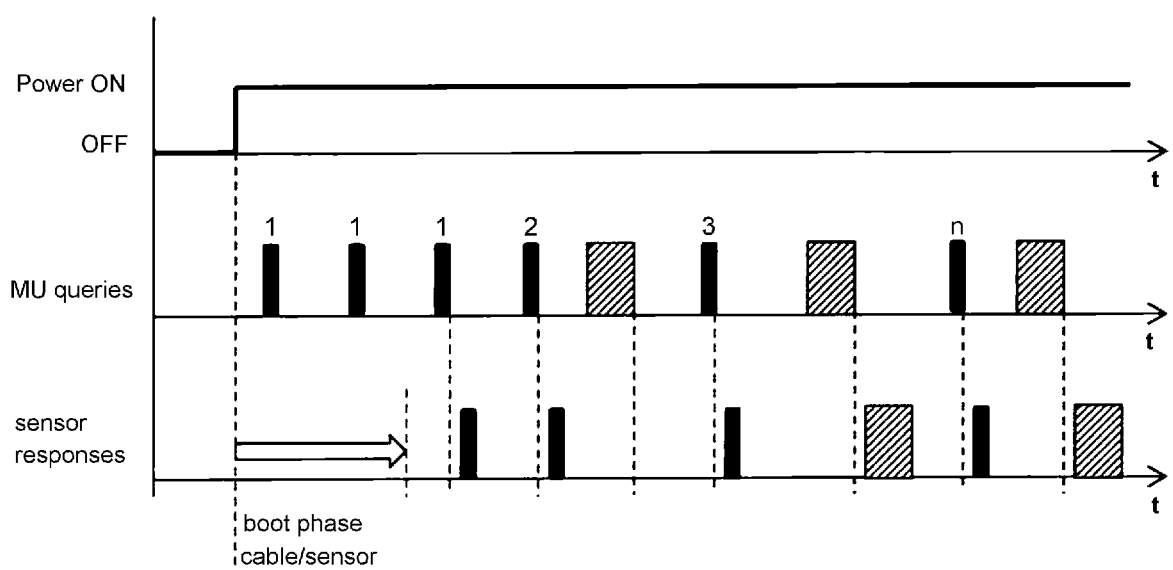
FIG. 4 depicts the starting behavior of the sensor, cable, and measuring transducer combination for fixed cable sensors according to the invention in an overview.

As mentioned, the method of the disclosure can also be used with fixed cable sensors, i.e., even if no intelligent unit is present in the cable itself. The connecting element 28 is then not configured as part of the cable 25, but instead, in this case, the connecting element 28 is part of the parent unit—for example, that of the transmitter 21. However, the above statements still remain valid. For fixed cable sensors, the link layer (e.g., layer 2 in the ISO/OSI layer model) of the transmitter 21 may take on the functionality regardless of the application layer (e.g., layer 7) or other layers, as shown in FIG. 4.

Another feature of the communication between the connecting element 28 and the sensor 22 is that the sensor 22 may independently send a message to the connecting element 28—for example, according to diagram shown in FIG. 2. It is, therefore, not a pure master-slave system that is operated by the connecting element 28 as the control unit. The information about the class membership does not need to flow only from the sensor 22 to the connecting element 28; the opposite direction or both directions is conceivable as well. In other words, a master-slave constellation, such as for the transmitter-sensor communication, is not required.

With the disclosed method, it is now possible to operate different cable and sensor classes on the same inductive coupling. The communication can be initiated by either the connecting element or the sensor itself, which allows for information to be transmitted faster. Parameters, commands, status or setting values can be transmitted as information from the connecting element 28 to the sensor 22 and/or back, independently of a transmitter communication. Now, at least the following information can be exchanged directly and/or set between the connecting element 28 and the sensor 22: performance class—e.g., standard performance class 15 mW or extended performance class with, e.g., 20 mW, total power consumption—several performance classes are also conceivable; consumer class—e.g., by default, the distribution of secondary-side rectified positive and negative raw voltage is offset, or alternatively they can be shifted, for example, in the direction of positive or negative voltage based upon the sensor principle, if this is required by the sensor for optimal functioning; modulation degree, higher or lower, depending upon the temperature or other properties; modulation type—e.g., by default, amplitude shift keying or, by way of example, frequency shift keying (e.g., in conjunction with a higher data rate); electronics temperature (e.g., in conjunction with modification of the modulation degree); error rate of the communication between the transmitter 21 and the sensor 22 (e.g., in conjunction with the modulation degree, data encoding, or data rate); data encoding—e.g., standard NRZ or, by way of example, 8B10B encoding; data rate—e.g., standard 9600 bit/s or, by way of example, 14400 bits/s.

While various embodiments of a method for communication between a sensor and a connecting element and methods of using the same according to the present disclosure have been described as having an illustrative design, the present disclosure may be further modified within the spirit and scope of this disclosure. The present application is therefore intended to cover any variations, uses, or adaptations of the disclosure using its general principles. Further, the present application is intended to cover such departures from the present disclosure as come within known or customary practice in the art to which this invention pertains.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. Alternative sequences may be varied and still remain within the scope of the present disclosure.

The invention claimed is:

1. A method for communication between a sensor and a parent unit connected to the sensor, the method comprising:
providing a connecting element, which includes a cable and a microcontroller, connected directly to a sensor via an inductive interface, wherein the connecting element is further directly connected via the cable with a parent unit, wherein the sensor is configured for acquisition of measured variables and for transmission of values dependent upon the measured variables;
in an initialization phase, establishing a first communication channel via the inductive interface between the sensor and the connecting element, each operating in respective basic modes, wherein:
the connecting element initiates communication with the sensor by querying the sensor using a first protocol;
the sensor responds to the query of the connecting element using the first protocol;
the sensor and connecting element exchange messages, which include operating parameters for which the sensor and connecting element are commonly configured, wherein the operating parameters include power consumption;
based on the exchanged messages, the sensor and the connecting element each switch to operate according to the commonly configured operating parameter of power consumption, thereby operating in a common higher mode; and
the first communication channel is established without instruction or a query from the parent unit;
activating the first communication channel such that the sensor and connecting element are jointly configured to operate in the higher mode and to exchange further messages using the first protocol, thereby ending the initialization phase;
upon ending the initialization phase, establishing a second communication channel between the sensor and the parent unit via the connecting element by communicating messages therebetween via a second protocol, wherein the second protocol is different than the first protocol, and wherein the connecting element does not affect the second communication channel or the second protocol;
activating the second communication channel such that the sensor and parent unit are jointly configured to communicate messages using the second protocol; and
transmitting the values dependent upon the measured variables from the sensor to the parent unit via the second communication channel using the second protocol.

2. The method of claim 1, further comprising, after the initialization phase, communicating from the sensor to the connecting element via the first protocol without instruction or a query from the parent unit.

3. The method of claim 1, further comprising, after the initialization phase, communicating from the connecting element to the sensor via the first protocol without instruction or a query from the parent unit.

4. The method of claim 1, wherein the operating parameters exchanged in the initialization phase further include an item of information on performance class, consumer class, modulation degree, modulation type, electronic temperature, error rate of the communication, data encoding, protocol type, or protocol version.

5. The method of claim 1, wherein:
when either the sensor or the connecting element is configured only to support operating in its respective basic mode, the sensor and the connecting element remain in their respective basic modes according to the operating parameters thereof.

6. The method of claim 5, the method further comprising:
in case of a fault, switching the sensor and the connecting element to their respective basic modes.

7. The method of claim 1, wherein the second protocol is synchronized with the first protocol.

8. The method of claim 1, wherein the sensor responds to a query from the parent unit only after the initialization phase.

9. The method of claim 1, wherein after communication between the sensor and the parent unit, further communication between the sensor and the connecting element is on-demand, cyclical, or event-driven.

10. The method of claim 1, wherein:
the sensor includes a first interface and the connecting element includes a complementary second interface, which comprise the inductive interface; and the sensor is supplied with power via the first and second interfaces.

11. The method of claim 10, wherein the microcontroller of the connecting element is disposed in the second interface.

12. The method of claim 10, wherein the first interface and the second interface each include a microcontroller.

13. The method of claim 1, wherein the communication between the sensor and the connecting element shares a transmission channel with the communication between the sensor and the parent unit.

14. The method of claim 13, wherein the communication between the sensor and the connecting element shares a transmission channel with the communication between the sensor and the parent unit by using time division multiplexing.

15. The method of claim 1, wherein the communications between the sensor and the connecting element and between the sensor and the parent unit occur simultaneously on different transmission channels.

16. The method of claim 1, wherein the operating parameters exchanged in the initialization phase further include an item of information on data rate.

\* \* \* \* \*